United States Patent
Hutchison et al.

(10) Patent No.: US 6,234,070 B1
(45) Date of Patent: May 22, 2001

(54) EGG BREAKING KNIFE

(75) Inventors: Mark Hutchison, Northville; Vladimir Mazur, West Bloomfield, both of MI (US)

(73) Assignee: Diamond Automations, Inc., Farmington Hills, MI (US)

( * ) Notice: Subject to any disclaimer, the term of this patent is extended or adjusted under 35 U.S.C. 154(b) by 0 days.

(21) Appl. No.: 09/362,390

(22) Filed: Jul. 28, 1999

(51) Int. Cl.[7] ........................................ A47J 43/14
(52) U.S. Cl. .................... 99/497; 99/571; 99/577; 99/580; 99/581; 30/120.1; 30/346; 83/932
(58) Field of Search ............... 99/497, 500, 582, 99/581, 577, 580, 571; 83/932, 694, 856, 167, 165; 30/120.1, 346, 279.2, 289

(56) References Cited

U.S. PATENT DOCUMENTS

| | | | |
|---|---|---|---|
| 894,106 | * | 7/1908 | Beel ................................ 99/582 X |
| 1,199,114 | * | 9/1916 | Robertson ......................... 99/582 X |
| 1,254,326 | * | 1/1918 | Hutchison et al. ................ 99/582 X |
| 2,718,906 | | 9/1955 | Adams et al. . |
| 2,815,055 | | 12/1957 | Willsey . |
| 3,029,849 | | 4/1962 | Willsey . |
| 3,082,804 | | 3/1963 | Shelton . |
| 3,133,569 | | 5/1964 | Shelton et al. . |
| 3,142,322 | | 7/1964 | Shelton et al. . |
| 3,180,381 | | 4/1965 | Shelton . |
| 3,185,194 | | 5/1965 | Ellis et al. . |
| 3,203,458 | | 8/1965 | Shelton et al. . |
| 3,417,798 | | 12/1968 | Shelton . |
| 4,068,573 | * | 1/1978 | Romero ............................. 99/582 X |
| 5,085,139 | | 2/1992 | Pellegrinelli ......................... 99/500 |
| 5,586,931 | * | 12/1996 | Williams, Jr. .................. 30/120.1 X |
| 5,617,782 | | 4/1997 | Thomas ................................. 99/500 |

FOREIGN PATENT DOCUMENTS 0 746 998 A1    12/1996    (EP) .

* cited by examiner

Primary Examiner—Reginald L. Alexander
(74) Attorney, Agent, or Firm—Kenyon & Kenyon

(57) ABSTRACT

An egg breaking knife used in an egg breaking device which increases the yield of the egg breaking device. The upper edge of the egg breaking knife is in a "V" shape. The "V" shape creates a lower drainage point to eliminate any "damming" of egg shell contents which may occur in the egg shell halves. The knife edge of the egg breaking knife of the present invention may also include a vertical slot or opening, preferably at the vertex or intersection point of the "V" shape, which assists in preventing "damming" of egg contents and enhances the drainage of egg contents from the egg shell halves. The lower edge of the egg breaking knife of the present invention may include a drip point, preferably located below the vertical slot, which serves to collect all egg content drippage at a single location, to ensure that a minimal amount of egg content drippage remain adhered to the egg breaking knife during egg content dumping.

21 Claims, 4 Drawing Sheets

EGG BREAKING KNIFE

BACKGROUND OF THE INVENTION

1. Field of the Invention

The present invention is directed for a knife used with an egg breaking element or cracker head that is part of a machine for breaking, separating, and inspecting eggs. In particular, the present invention is a knife which is designed to increase the egg content yield of such a machine.

2. Description of the Related Art

Egg breaking and separating machines are known in the prior art. Examples of such devices are shown in U.S. Pat. Nos. 2,718,906; 2,815,055; 3,029,849; 3,082,804; 3,133,569; 3,142,322; 3,180,381; 3,185,194; 3,203,458; 3,417,798; 5,085,139; 5,617,782 and European Patent Application No. 0 746 998.

FIG. 1 represents a typical prior art egg breaking elements or cracker head used with prior art egg breaking devices. The egg breaking device includes a series of egg breaker elements 5 which are conveyed by an egg breaker and separator conveyor 2. Pivoted clamping fingers 7, of which there are generally two on each egg breaker element 5, are initially in a raised condition 7', shown in dashed lines in FIG. 1, in which they are pivoted away from cup halves 8 on the egg breaker element 5. An egg E is rolled onto the cup halves 8 on the egg breaker element 5, and then the pivoted clamping fingers 7 are pivoted down toward the cup halves 8, to the position shown in solid lines in FIG. 1. The egg E is thereby gripped between the pivoted clamping fingers 7 on the top and the cup halves 8 on the bottom.

After the egg E has been gripped in cup halves 8 of egg breaker elements 5 by clamping fingers 7, the gripped eggs E are conveyed by egg breaker and separator conveyor 2 to an egg breaking station or location. At the egg breaking station or location, the eggs E are broken by egg breaker knives 31 on egg breaker elements 5. Breaking is accomplished by pivoting the egg breaker knives 31 from a retracted position 31', shown in dashed lines in FIG. 1, to a breaking position, shown in solid lines in FIG. 1. In the breaking position, the egg breaker knives 31 impact against the shell of egg E, thereby breaking the shell of the egg E into two egg shell halves.

The cup halves 8 are thereafter pivoted, in directions into and out of the paper in FIG. 1, to cause the contents of eggs E to fall into an egg separator element 6 associated with each egg breaker element 5. Egg separator element 6 can include an egg yolk cup 9 and an egg white receiver 30 of any known type, whereby the egg yolk of egg E is caught in egg yolk cup 9 and the egg white of egg E is drained from egg yolk cup 9, by the force of gravity, into egg white receiver 30.

FIGS. 2 through 5 show an end view of the egg breaker element of FIG. 1, through a sequence of operation. In a first step, shown in FIG. 2, an egg is rolled or otherwise placed on cup halves 8 while the clamping fingers are in a raised condition 7'. In the next step, shown in FIG. 3, the clamping fingers 7 are pivoted down, in directions G, to grip the egg E between the clamping fingers 7 and the cup halves 8. The first two steps are accomplished with the egg breaker knives in a retracted position 31', below the lowermost portion of the shell of the egg B. Thereafter, at a breaking station or location, the egg breaker knives 31 are pivoted rapidly upward, in directions B, to the position shown in FIG. 3, which causes the edges of the egg breaker knives 31 to impact against and crack the shell of the egg E to create two egg shell halves E'. The clamping fingers 7, cup halves 8, and egg breaking knifes 31 associated with each egg shell half E' is thereafter pivoted away, in directions P, from its counterpart associated with the other egg shell half E', as shown in FIG. 5. As a result, the contents C of the egg E are dumped from the egg shell halves E', as shown by the arrows in FIG. 5, preferably into the egg separator element 6 shown in FIG. 1.

SUMMARY OF THE INVENTION

Several disadvantages have been discovered with the prior art egg breaking element 5 as shown in FIGS. 1–5. One disadvantage is that the straight upper edges 30 of the egg breaking knives 31 (as shown in FIG. 1) tend to cause a "damming" effect with some of the egg contents C in egg E. In other words, at least a portion of the egg contents C, located in the shaded area in FIG. 5, are trapped in the egg shells E' by the upper edge 30 of egg breaking knives 31. This trapped egg content C material is not dumped into the egg separator element 6, and therefore decreases the yield of the egg breaking device.

Another disadvantage which has been found in the prior art egg breaking element 5 as shown in FIGS. 1–5 is that the relatively flat lower edge 32 of the egg breaking knives 31 causes egg contents C to collect and drip at various locations across the entire length of the lower edge 32. As a result, a number of drip points are created on the lower edge 32, with the result that several drips may continue to adhere to the edge and not drip into the egg separator element 6. This also tend to decrease the yield of the egg breaking device, because this adhering egg content material is not transferred to the egg separator element 6. Finally, the straight upper edge 30, which is sharpened to enhance the breaking ability of the egg breaking knives 31, can cause cutting or perforation of the egg yolk sac, which is an undesirable result if the egg breaking machine is designed to separate egg yolks from egg whites.

It is an object of the present invention to provide an egg breaking knife used with an egg breaking element which increases the yield of the egg breaking device and eliminates some of the disadvantages of prior art egg breaking knives.

The apparatus of the present invention is an egg breaking knife which incorporates several features which eliminate the problems that are a part of prior art egg breaking elements. The upper edge of the egg breaking knife of the present invention is in a "V" shape, which "V" shape creates a lower drainage point to eliminate any "damming" of egg shell contents which may occur in the egg shell halves. The "V" shape also allows for increased surface area contact with the shell of the egg, thereby improving the breaking ability of the egg breaking knife. Furthermore, the "V" shape allows for an unsharpened area at the vertex of the "V" shape, which unsharpened area can allow the yolk to be dumped out of the egg shell halves while reducing the chance that the egg yolk will be cut or perforated. The upper edge of the egg breaking knife of the present invention may also include a vertical slot or opening, preferably at the vertex of the "V" shape, which also assists in preventing "damming" of egg contents and enhances the drainage of egg contents from the egg shell halves. Finally, the lower edge of the egg breaking knife of the present invention may include a drip point, preferably located below the vertical slot, which serves to collect all egg content drippage at a single location, to ensure that a minimal amount of egg content drippage remains adhered to the egg breaking knife during egg content dumping.

DETAILED DESCRIPTION OF THE INVENTION

Figure 1:
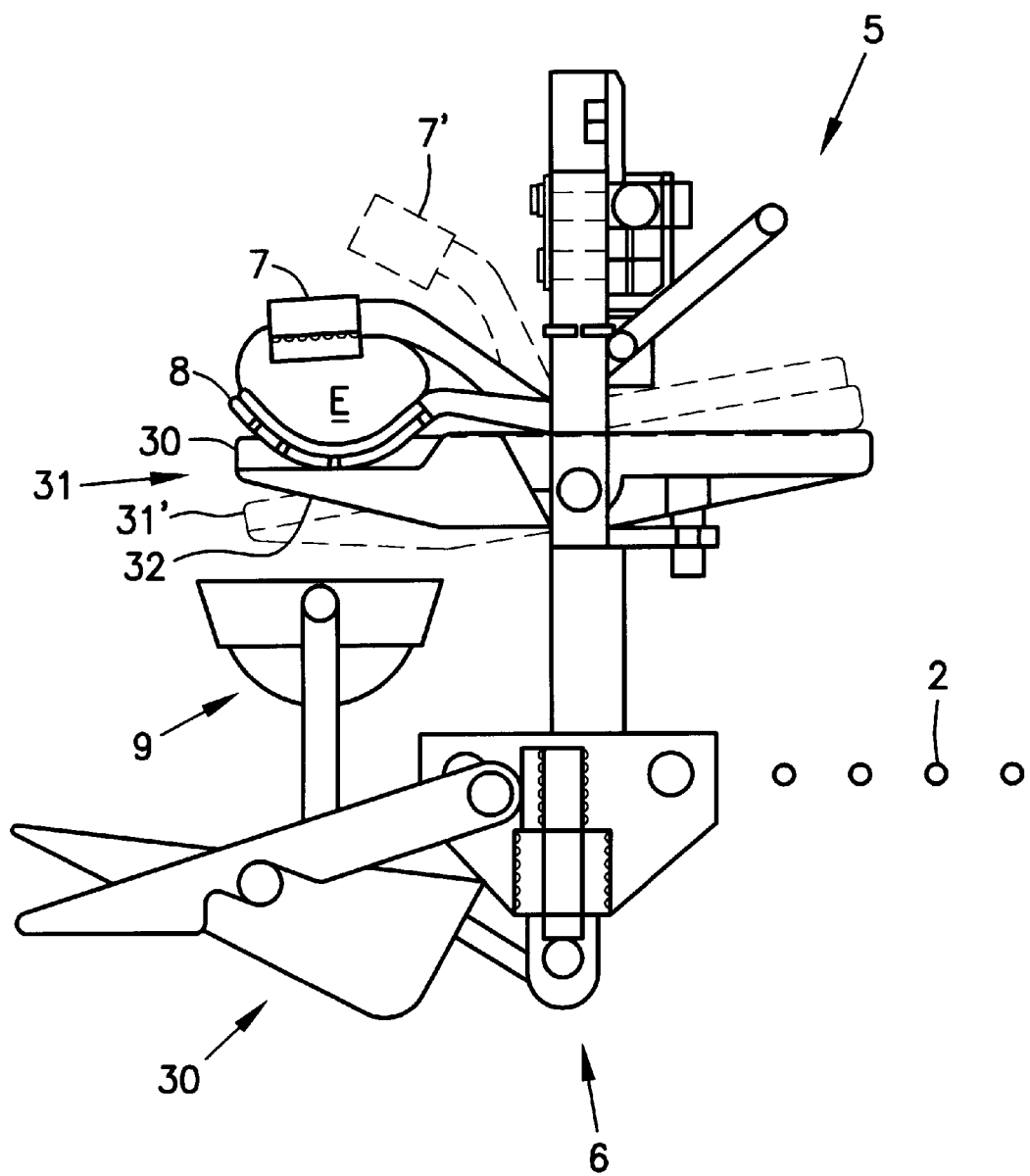
FIG. 1 shows a side elevation view of a prior art egg breaking element.
Figure 2:
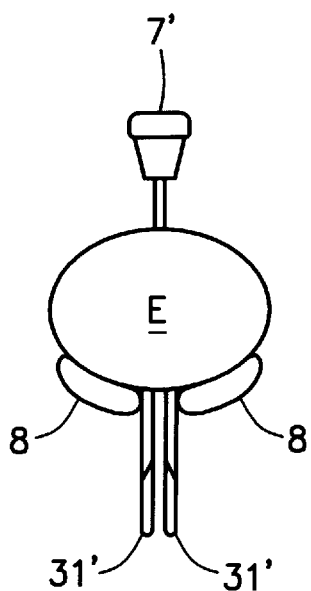
FIGS. 2 through 5 show an end elevation view of a prior art egg breaking element, through a sequence of operation.
Figure 3:
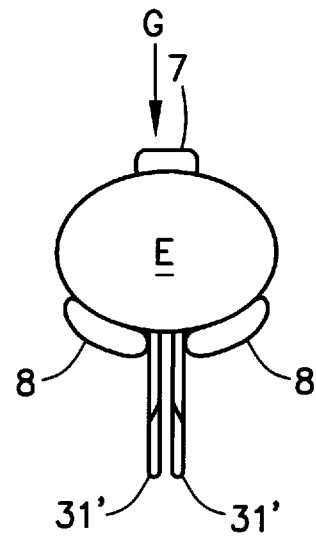
Figure 4:
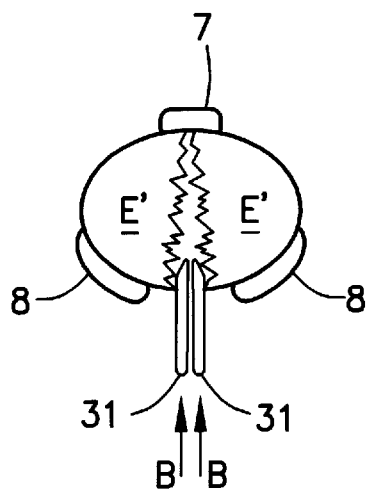
Figure 5:
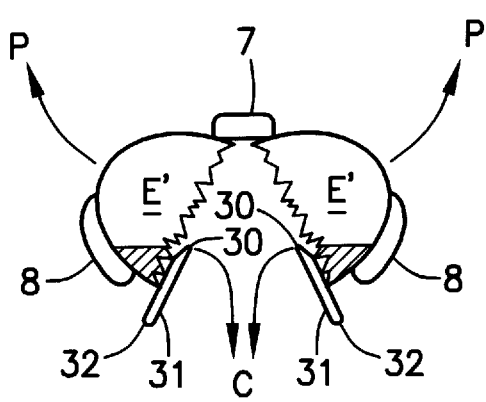
Figure 6:
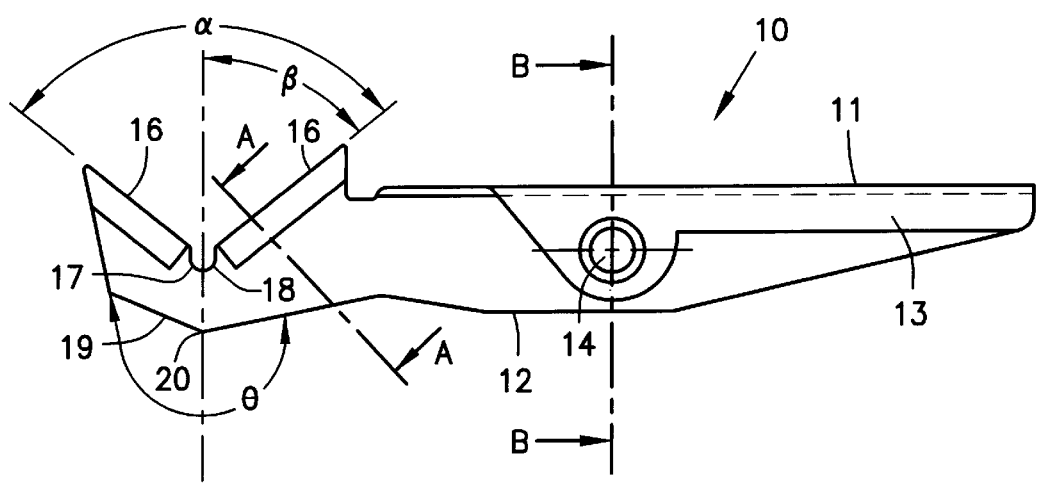
FIG. 6 shows a side elevation view of an egg knife according to the present invention

FIG. 6 shows a side elevation view of an embodiment of the egg breaking knife 10 of the present invention. It is to be understood that the egg breaking knife 10 shown in FIG. 6 is one of a pair of egg breaking knives used in an egg breaking element, which can be part of an egg breaking machine. The pair of egg breaking knives will preferably be mirror images of one another. The manner in which the egg breaking knife 10 is integrated into an egg breaking element would be identical or similar to the configuration shown in FIGS. 1 through 5.

Figure 7:
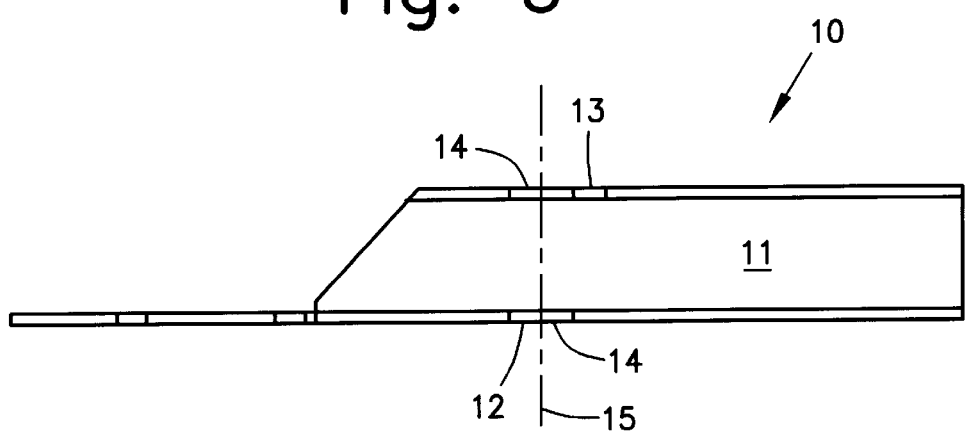
FIG. 7 shows a bottom plan view of the egg knife of FIG. 6.

The egg breaking knife 10 is preferably constructed of a material which complies with Food & Drug Administration (FDA), U.S. Department of Agriculture (USDA) and Food Safety Inspection Service (FSIS) regulations for food processing machinery, such as stainless sheet steel. The stainless sheet steel is cut or stamped, and then bent to form the upper section 11, knife section 12, and pivot section 13 shown in FIGS. 7 and 8. A pivot hole 14 passes through both the knife section 12 and the pivot section 13. A pivot axis 15 extends through the center of the pivot hole 14. A pin or bearing, not shown in FIGS. 6 through 9, would pass through the pivot hole 14, to thereby allow the egg breaking knife 10 to pivot about pivot axis 15. In this way, both egg breaking knives 10 of an egg breaking knife pair can pivot from a retracted position to a breaking position, at which breaking position the egg breaking knives 10 break an egg into egg shell halves.

Figures 8, 9:
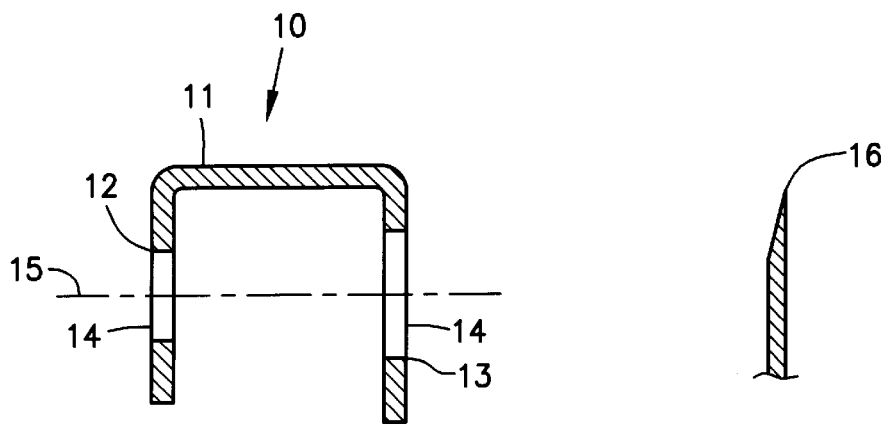
FIG. 8 shows a cross-sectional view through line B—B in FIG. 6.
FIG. 9 shows a cross-sectional view through line A—A in FIG. 6.

Egg breaking knife 10 has, on knife section 12, at least one knife edge 16. In the embodiment of FIGS. 6 through 10, the egg breaking knife 10 includes two knife edges 16. The knife edges 16 are formed in a "V" shape, i.e., they project upwardly and outwardly at an angle from a vertex 17. In a preferred embodiment of the invention, the knife edges are set apart an angle $\alpha$ of approximately 95°, and the proximal knife edge 16 is set back from a vertical axis by an angle $\beta$ of approximately 51°. As shown in FIG. 9, the knife edges 16 are formed, such as by grinding, to include a sharp edge. This sharp edge contacts the shell of the egg to be broken, and cracks the egg shell so as to form two egg shell halves.

At the vertex 17 of the knife edges 16 is preferably formed a vertical slot 18. In the embodiment of FIGS. 6 through 9, the vertical slot 18 is in the form of a circular hole formed around the vertex 17. However, it is to be understood that many other shapes could be used to form the vertical slot 18.

The lower edge 19 of the knife section 12 may include a drip point 20. In the embodiment of FIGS. 6 through 10, the drip point 20 is formed by an angled portion of lower edge 19, with the vertex of the angled portion forming the lowermost point on the lower edge 19 and thus the drip point 20. The angled portion may describe an angle $\theta$ of approximately 195°.

Figure 10:
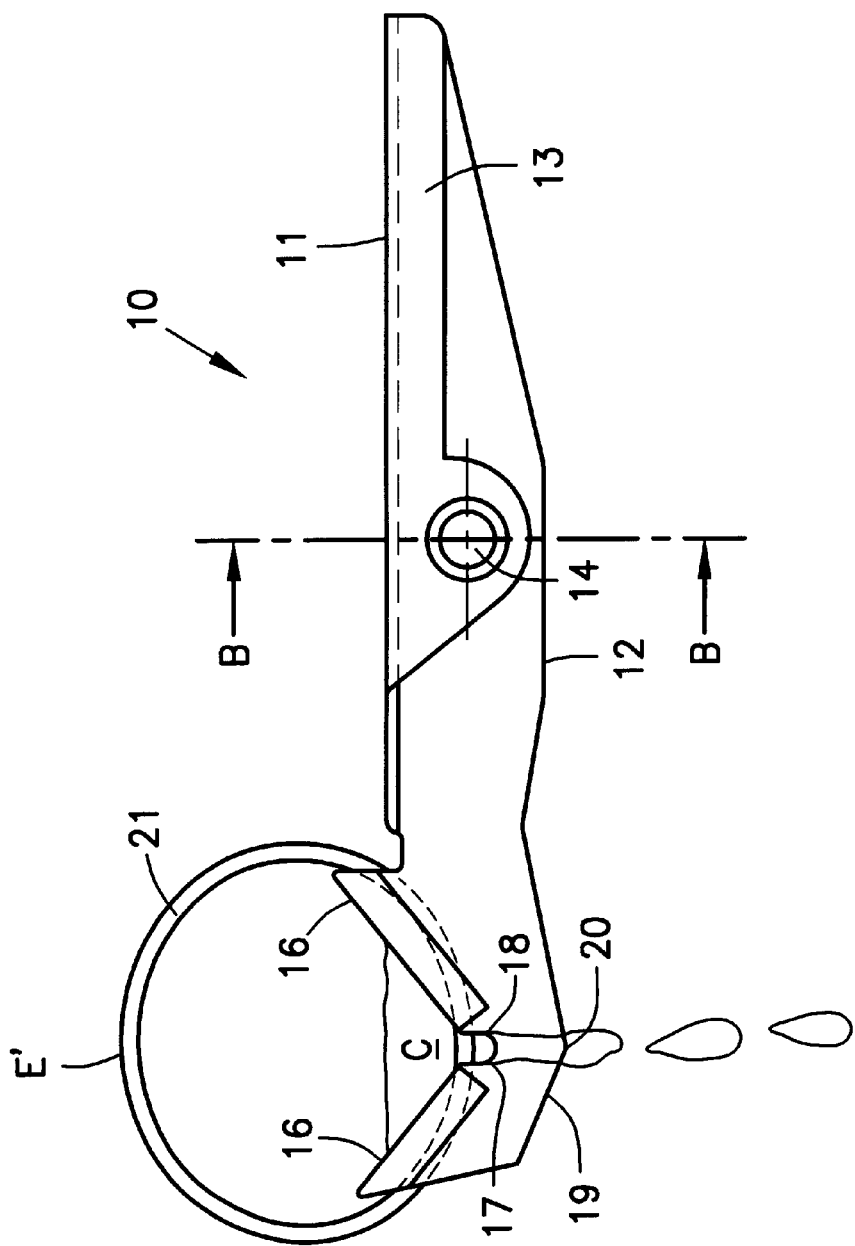
FIG. 10 shows the egg knife of FIG. 6 in operation with an egg shell half and egg contents.

FIG. 10 shows the manner in which the present invention advantageously increases the yield of an egg breaking device, by ensuring that a maximum amount of egg content C are dumped from an egg shell half E' after breaking. The knife edges 16 act to create a crack 21 in the shell of an egg, resulting in the creation of two egg shell halves E', one associated with each egg breaking knife 10 of a pair of egg breaking knives 10. The "V" shape of the knife edges 16 acts to increase the surface area of contact of the knife edges 16 and the egg shell, thereby improving the performance of the shell-breaking step. The egg breaking knives 10, after the shell is cracked, are pivoted away from each other (in a manner as shown in FIG. 5) to dump the egg contents C from the egg shell halves E'. As may be seen in FIG. 10, the "V" shape of the knife edges 16 ensures that the vertex 17 will be located at or below the lowermost portion of the shell of each egg shell half E'. As a result, no "damming" occurs, because the egg contents C may drain through the area of vertex 17. In addition, the vertical slot 18, which is formed at the vertex 17, also ensures that the egg contents C will all drain out from the egg shell halves E', and will not be "dammed" by the knife edges 16. The vertical slot 18 and the vertex 17 also form an area where there is no sharp edges, which assists in allowing the egg yolk to dump out of the egg shell halves E' without the egg yolk sac being cut or perforated by sharp edges on the egg breaking knife 10.

The vertical slot 18 also serves to direct any egg content drippage in the direction of the drip point 20, which is preferably located directly vertically below the vertical slot 18. The drip point 20, as discussed above, is preferably the lowermost point on the lower edge 19 of the knife section 12. Because of this orientation of the drip point 20, any egg content drippage tends to collect at the drip point 20, and nowhere else along the lower edge 19 of the knife section 12. Any egg drippage along the lower edge 19 tends to travel downwardly along lower edge 19, under the influence of gravity, to the lowermost point on that edge, which is the drip point 20. As a result, any egg content drippage will tend to be collected and amass at the drip point 20, and the increased mass at the drip point will act to cause improved dripping of the egg contents off of the egg breaking knife 10. Therefore, a minimum amount of egg content C will remain on the knife section 12, and a maximum amount of the egg content C of each egg will be dumped or will drip out of the egg and into an egg separator element or any other egg content collection area. Therefore, the egg content yield of an egg breaking device which uses the egg breaking knife 10 of the present invention will be improved over prior art devices.

The present invention contemplates a number of different variations on the above-described preferred embodiment. It is to be understood that the above description is only of one preferred embodiment, and the scope of the invention is to be measured by the claims below.

What is claimed is:

1. An egg-breaking knife comprising:
   a knife edge having two edges, at least a portion of the knife edge projecting upwardly and at an angle from a vertex; and
   a vertical slot at the vertex, wherein the two edges are at an angle from one another of approximately 95°.

2. The egg-breaking knife of claim 1, wherein:

the at least a portion of the knife edge projects from the vertex at an angle of approximately 51° from vertical.

3. The egg-breaking knife of claim 1, wherein:

the vertical slot is a circular hole.

4. The egg-breaking knife of claim 1, wherein:

the knife edge is sharpened.

5. The egg-breaking knife of claim 4, wherein:

the vertex is unsharpened.

6. The egg-breaking knife of claim 1, further comprising:

a drip point on a lower edge of the egg-breaking knife.

7. The egg-breaking knife of claim 6, wherein:

the drip point is directly below the vertex.

8. The egg-breaking knife of claim 6, wherein:

the drip point is the lowermost point on the lower edge.

9. The egg-breaking knife of claim 6, wherein:

the drip point is an angled portion on the lower edge.

10. The egg-breaking knife of claim 9, wherein:

the angled portion forms an angle of approximately 195°.

11. An egg-breaking knife comprising:

an upper knife edge; and a lower edge, the lower edge including a drip point, the drip point including an angled portion on the lower edge, and wherein the drip point is the lowermost point on the lower edge.

12. The egg-breaking knife of claim 11, wherein:

at least a portion of the knife edge projects upwardly and at an angle from a vertex.

13. The egg-breaking knife of claim 12, wherein:

the knife edge includes two edges, and wherein both of the edges project upwardly and at an angle from the vertex.

14. The egg-breaking knife of claim 13, wherein:

the two edges are at an angle from one another of approximately 95°.

15. The egg-breaking knife of claim 12, wherein:

the at least a portion of the knife edge projects from the vertex at an angle of approximately 51° from vertical.

16. The egg-breaking knife of claim 12, further comprising:

a vertical slot at the vertex.

17. The egg-breaking knife of claim 16, wherein:

the vertical slot is a circular hole.

18. The egg-breaking knife of claim 11, wherein:

the knife edge is sharpened.

19. The egg-breaking knife of claim 12, wherein:

the vertex is unsharpened.

20. The egg-breaking knife of claim 12, wherein:

the drip point is directly below the vertex.

21. The egg-breaking knife of claim 11, wherein:

the angled portion forms an angle of approximately 195°.

* * * * *